C. E. BALLOU.
INSULATED RAIL JOINT.
APPLICATION FILED AUG. 14, 1915.

1,164,974.

Patented Dec. 21, 1915.

WITNESSES:
Jas. K. M°Cathran
F. T. Chapman

Charles E. Ballou,
INVENTOR

Attorneys

UNITED STATES PATENT OFFICE.

CHARLES E. BALLOU, OF ROANOKE, VIRGINIA, ASSIGNOR TO BALLOU SAFETY RAIL-JOINT CO. INC., OF ROANOKE, VIRGINIA, A CORPORATION OF VIRGINIA.

INSULATED RAIL-JOINT.

1,164,974.  Specification of Letters Patent.  Patented Dec. 21, 1915.

Application filed August 14, 1915. Serial No. 45,534.

*To all whom it may concern:*

Be it known that I, CHARLES E. BALLOU, a citizen of the United States, residing at Roanoke, in the county of Roanoke and State of Virginia, have invented certain new and useful Improvements in Insulated Rail-Joints, of which the following is a specification.

This invention has reference to rail joints and particularly to joints designed to be used in connection with rails carrying electric currents where it is needful to insulate the rails, especially at the joint.

In accordance with the present invention the fish plates are so made as to rigidly engage opposite sides of a rail at the end thereof and as rigidly engage the adjacent end of the next succeeding rail, but in such relation to the last-named rail as to receive and retain electrical insulating material. Despite the presence of such material the fish plates are straight throughout so far as their opposite faces are concerned, and, therefore, have the same relation to the web of the rail throughout the length of the fish plates, but where rail insulating material is interposed, which insulating material is customarily in sheet form, the corresponding portions of the fish plates are appropriately narrowed to permit the interposition of the insulating material.

In conjunction with the fish plate there are provided bolts extending through the fish plates and web of the rail as usual, but these bolts are of a character that when the nuts are turned up tight they so engage the fish plates that the nuts do not work loose even in the absence of nut locks, wherefore the insulation is held tightly in place and does not wear because there is no relative movement between the insulation, the fish plates and the rail.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified so long as such changes and modifications come within the scope of the appended claims.

Figure 1:
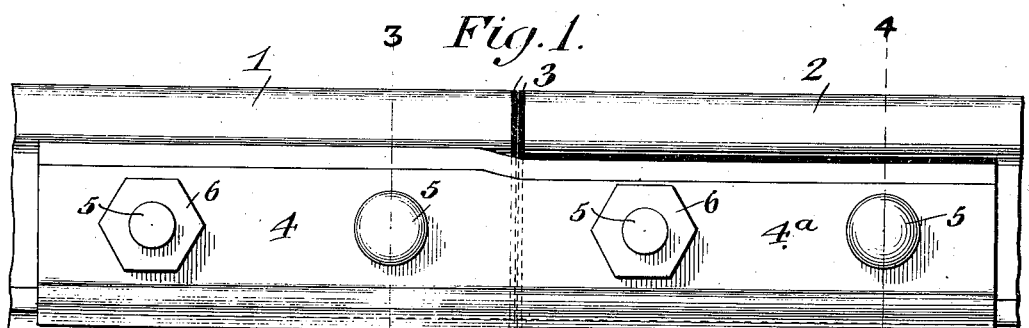
Figure 2:
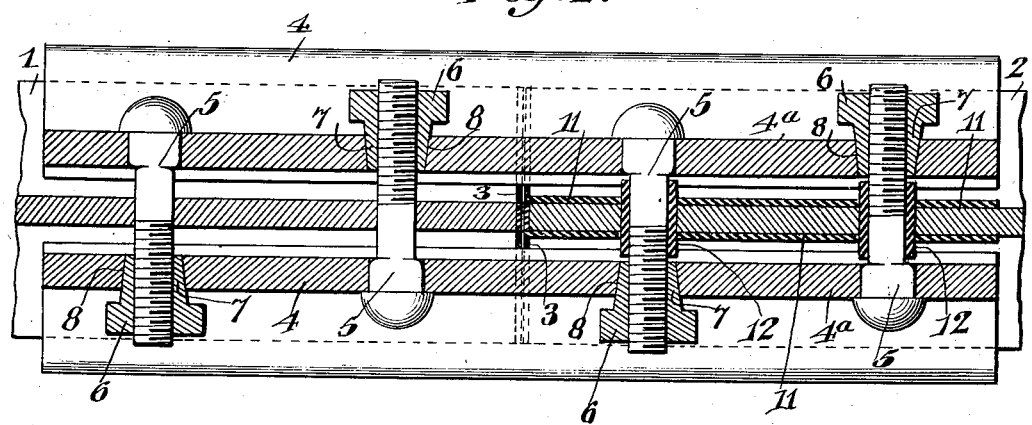
Figure 3:
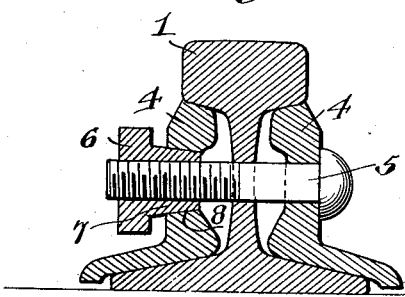
Figure 4:
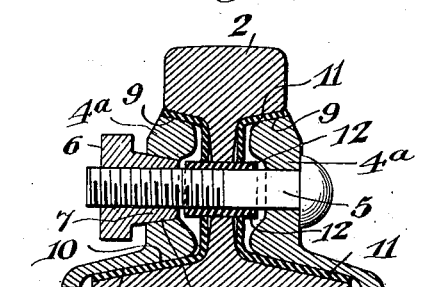
Figure 5:
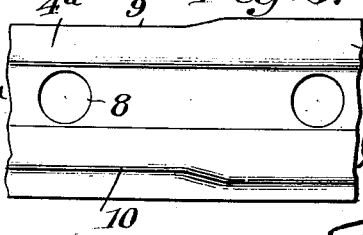

In the drawings:—Figure 1 is an elevation of the meeting ends of two rails with the insulated joint applied thereto. Fig. 2 is a horizontal longitudinal section through the bolts and the portions of the rails and fish plates in the same plane. Fig. 3 is a section on the line 3—3 of Fig. 1. Fig. 4 is a section on the line 4—4 of Fig. 1. Fig. 5 is an elevation of the middle portion of a fish plate showing the inner face thereof.

Referring to the drawings there are shown two rails 1, 2, respectively, with meeting ends separated by insulation 3 which may be in the form of sheets of appropriate shape as may be needful.

The meeting ends of the rails are held together by fish plates 4 which so far as the joining of the rails is concerned perform the offices of ordinary fish plates. Traversing holes in the fish plates and corresponding holes through the webs of the rails are bolts 5 which may be bolts of usual character except that each bolt is provided with a nut 6 having an exteriorly tapered neck 7 axially projecting from one face and the fish plate is provided with correspondingly tapering passages 8 for receiving the tapering necks of the nuts.

The taper is of but few degrees with respect to the longitudinal axis of the nut and when the parts are assembled and the nuts are screwed tight the taper neck 7 entering the taper hole 8 binds the nut so firmly in the hole and jams it so tightly upon the threaded end of the bolt that even under the severe conditions of railway traffic experience has shown that the nuts hold tenaciously to the threaded ends of the bolts and do not turn on the bolts or in the fish plates, wherefore when once screwed tight the nuts do not become loosened except such loosening be purposely performed with the aid of a suitable wrench.

Each fish plate is narrowed at a point about midway of its length corresponding to the position of the meeting ends of the track rails, and this narrowing is continued from the mid point of the fish plate to one of the ends thereof. For convenience of description the narrowed portion of the fish plate is designated by the reference numeral 4ª.

The bolt holes are all located in the web of the rail at the same height above the base portion thereof and at the same distance below the tread of the rail. This means that when a fish plate is in place the end 4ª has its upper edge indicated at 9 spaced a distance below the bottom of the tread portion of the rail, while the lower portion of the fish place, indicated at 10, is elevated a short distance above the top of the corresponding base flange of the rail. This spacing of the fish plate from the rail provides for the introduction of insulating material 11 between the fish plate and the rail wherever the fish plate would be liable to contact with the rail and by having the insulating material of sheet or other similar form and of sufficient thickness the fish plates can be brought up into tight and firm engagement with the insulating material to force the latter as firmly against the rail while the full height portion of the fish plate is in like firm engagement with the other track rail.

Those bolts traversing the end 4ª of the fish plate are separated from metallic contact with the web of the rail through which they extend by sleeves 12 of insulating material extending through the webs.

The fish plates are of the same thickness throughout but are of less height for about half their length than at the other half, being narrowed both at the top and bottom to provide for the interposition of insulating material between the narrowed end of the fish plate and the entire portion of the rail with which the said narrowed portion of the fish plate is associated.

Experience has taught that the insulation is permanently complete and does not deteriorate with use under the severe conditions imposed upon it by railway traffic. This is believed to be due to the wedging or jamming action of the narrow end of the fish plate upon the insulation holding the latter in the most firm contact with the rail and to the use of the bolts described, whereby the fish plate is retained in its initial relation to the rail and to the insulation despite weather and temperature variations and the shocks and jars imparted to the rail joint by passing cars or trains.

What is claimed is:—

1. An insulated rail joint comprising fish plates each of full height for about half its length to engage one of the rails and each for the remainder of its length of reduced height both top and bottom to be spaced at all points away from the rail with which it is associated, and insulating material interposed between the narrowed portion of the fish plate and the rail, each fish plate being straight throughout its length.

2. An insulated rail joint comprising fish plates each of full height for about half its length to engage one of the rails and each for the remainder of its length of reduced height both top and bottom to be spaced at all points away from the rail with which it is associated, and insulating material interposed between the narrowed portion of the fish plate and the rail, each fish plate being straight throughout its length, and the joint structure including bolts with nuts having tapered shanks axially extended from the nuts, and the fish plates having tapered passages receiving the taper shanks and to which the latter are adapted, whereby the nuts automatically hold their position when once screwed tight.

3. A rail joint comprising fish plates each for about half its length of a height to engage the flange and tread portion of the rail and for the remainder of its length reduced in height both with respect to the top and bottom of the fish plate to be spaced away from the flange and tread portion, insulating material interposed between the narrowed end of the fish plate and the rail, and bolts extending through both halves of the fish plate and the corresponding portions of the webs of the rails with those bolts extending through the narrowed end of the fish plate insulated from the rail web through which they extend, and insulating material interposed between the narrowed end of the fish plate and the portion of the rail opposite to which it is located to be engaged by said portion of the fish plate and clamped thereby against the rail, each bolt having a nut with an exteriorly tapered axial extension and the fish plate having a correspondingly tapered passage for the extension of the nut with the angle of taper such as to cause a firm locking of the nut to the fish plate resistant to all automatically applied forces tending to loosen the nut.

In testimony whereof I have affixed my signature in presence of two witnesses.

CHARLES E. BALLOU.

Witnesses:
ERNEST N. JENNINGS,
HETTIE M. WHITLOW.